Patented Aug. 5, 1930

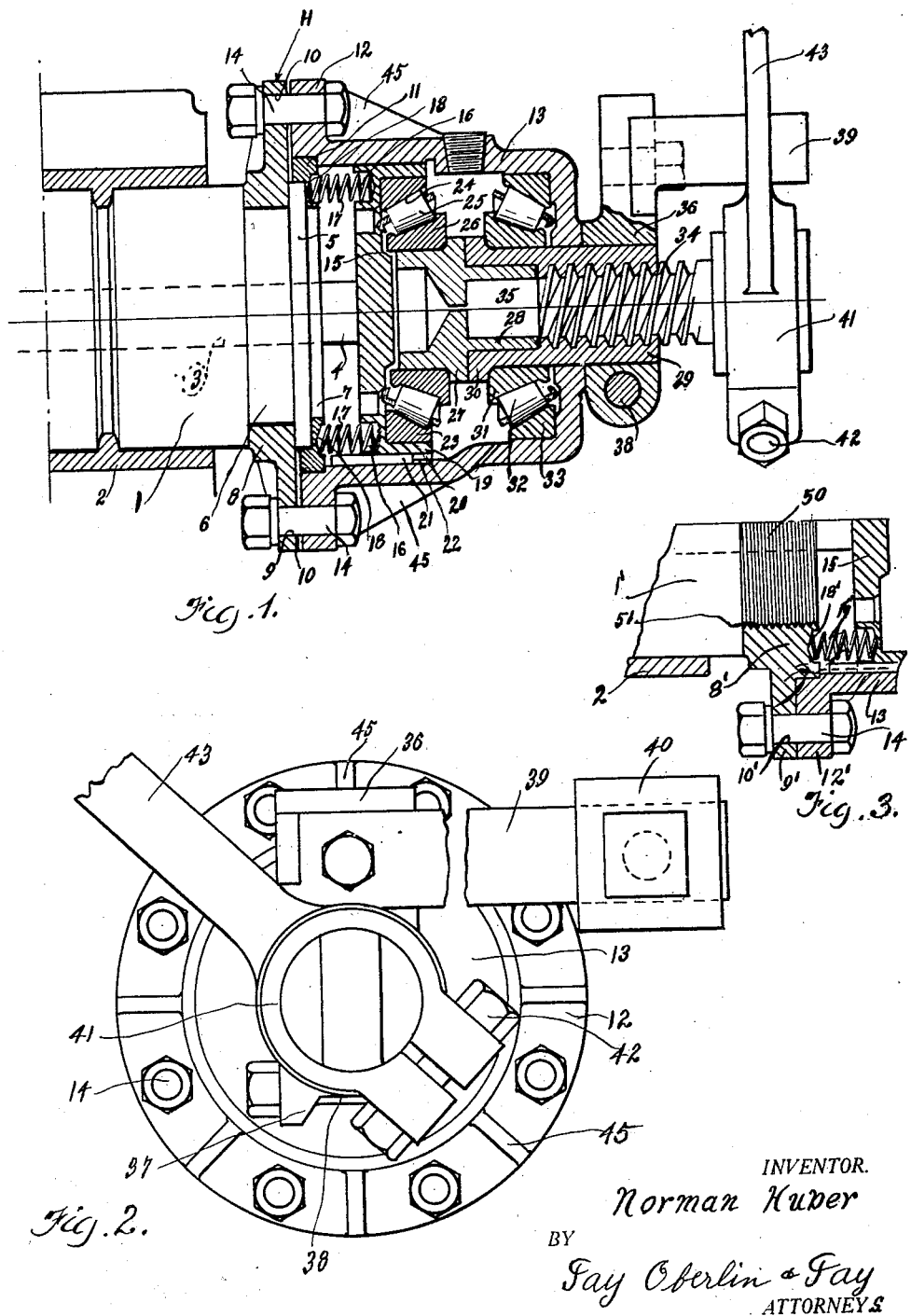

1,772,182

UNITED STATES PATENT OFFICE

NORMAN HUBER, OF DULUTH, MINNESOTA, ASSIGNOR TO CLYDE IRON WORKS, OF DULUTH, MINNESOTA, A CORPORATION OF MAINE

CLUTCH-ACTUATING MECHANISM

Application filed September 15, 1927. Serial No. 219,616.

This invention, as indicated, relates to a clutch actuating mechanism, and more specifically to such a mechanism in which the friction between the thrust members and the reacting friction is taken up by means of roller bearings.

In the actuation of large clutches, considerable difficulty is often experienced due to the amount of friction which is generated between thrust members and between said members and the casing surrounding them. The primary object of this invention is to obviate such difficulties and to provide a clutch actuating mechanism which will be satisfactory under working conditions with even the largest of clutches.

To the accomplishment of the foregoing and related ends, said invention, then, consists of the means hereinafter fully described and particularly pointed out in the claim; the annexed drawings and the following description setting forth in detail certain mechanism embodying the invention, such disclosed means constituting, however, but one of various mechanical forms in which the principle of the invention may be used.

In said annexed drawings:—

Fig. 1 is a longitudinal section through mechanism forming an embodiment of the invention; Fig. 2 is an end elevation of said mechanism seen from the right hand of Fig. 1; and Fig. 3 is a fragmentary sectional view of a modification of the attaching means.

Referring more particularly to Fig. 1, H indicates generally the clutch actuating mechanism which is the subject of this invention.

The shaft 1 of the drum is mounted to rotate in bearing 2, and is provided with a bore 3 of relatively small diameter in which is mounted a thrust pin 4, one end of which projects outwardly beyond the end of such shaft. The shaft 1 is provided near its end with a flange 5 defining a groove 6 and a reduced end portion 7. Mounted in said groove is a ring 8 having a flange 10 provided with apertures 9 at spaced points about its periphery, while an adapted ring 11 is mounted on the reduced outer end 7 of said shaft 1, and is clamped in position between said flange 10 and a flange 12 on a casing 13, said flanges being connected by means of bolts 14 passing through said apertures 9 and similar apertures in the flange 12. Mounted in said casing 13 and in engagement with the projecting end of the thrust pin 4 is a thrust plate 15 provided with a plurality of recesses 16, each of which receives one end of one of a plurality of springs 17, the opposite ends of which are received in similar recesses 18 in the adapter ring 11. Said plate 15 is provided with a skirt 19 which is formed with a groove 20 adapted to be brought into alignment with the groove 22 in one wall of the casing 13. Said grooves receive a key 21 to prevent relative rotation between said casing 13 and the thrust plate 15. A member 23 having a conical face 24 is mounted in the recess formed by the skirt 19, said face 24 providing one element of a bearing race, the other element of which is formed on a member 26 carried by a thrust disk 27. Conical rollers 25 are received between the members 23 and 26.

The thrust disk 27 is formed on its outer face with a sleeve 28 received in a corresponding recess in a thrust nut 29. Said nut 29 is provided with a shoulder 30 which retains an annulus 31 on which is formed one member of a race for a plurality of conical rollers 32, the other member of said race being formed on a member 33 which is mounted in the casing 13. A thrust screw 34, having a reduced end 35, is threadedly mounted in the nut 29, and said end 35 is received in the sleeve 28 of the thrust disk 27. Said nut 29 is held against rotation by a clamp 36 which is split to provide ears 37 adapted to be forced toward each other by a bolt 38. Said clamp 36 is held against movement by a bracket 39 received in a dog 40 attached to the frame D, or to any other immovable element.

A clamp 41 is adapted to be received on the outer end of the thrust screw 34 and to be fastened thereto by means of a bolt 42, and said clamp 41 carries an arm 43 for operating said screw. The casing 13 is provided with reinforcing ribs 45 at spaced points about its periphery.

The operation of the device is believed to be obvious from the above description, but a brief summary thereof will be given. The casing 13, in virtue of its connection through the ring 8 with the shaft 1, rotates with said shaft. Movement of the arm 43 causes the screw 34 to advance through the stationary nut 29 and thus to force the thrust disk 27 toward the left, as seen in Fig. 2, against the force of the springs 17. It will be obvious that the friction between the elements 27 and 15 will be taken up by the rollers 25, and that the reactionary friction between the elements 13 and 29 will be taken up by the rollers 32. Movement of the disk 15, as above described, will of course cause the thrust pin 4 to be moved in a like direction to operate the clutch (not shown). Reverse movement of the arm 43 permits the springs 17 to move the disk 15 back to the position shown in Fig. 1.

Referring to the modification disclosed in Fig. 3, the shaft 1' is provided with a reduced screw threaded end 50, and the ring 8' is provided with screw threads 51 for cooperation therewith. The ring 8' carries a flange 9' provided with apertures 10' for the reception of bolts 14 which secure the flange 12' of the casing 13 to said ring 8'. This structure obviates the use of the adapter ring 11 and recesses 18' for the reception of adjacent ends of the springs 17 are therefore provided in one face of said ring 8'. The operation of the device illustrated in Fig. 3 is the same as that of the device illustrated in the other figures.

Other modes of applying the principle of my invention may be employed instead of the one explained, change being made as regards the mechanism herein disclosed, provided the means stated by the following claim or the equivalent of such stated means be employed.

I therefore particularly point out and distinctly claim as my invention:—

In a clutch actuating assembly, the combination with a shaft having a bore, a thrust pin in said bore and projecting therefrom and a groove and a reduced portion on said shaft and separated by a flange, of a ring retained in said groove, a casing connected to said ring, an adapter fitting over said reduced portion and clamped between said flange and said casing, a plate in said casing and in contact with the projecting end of said pin, resilient means between said plate and said adapter and adapted to force said plate away from said adapter, means adapted to force said plate toward said adapter, and friction reducing means between said last-mentioned means and said plate.

Signed by me, this 9 day of September, 1927.

NORMAN HUBER.